United States Patent
Koehorst et al.

(10) Patent No.: US 8,580,224 B2
(45) Date of Patent: Nov. 12, 2013

(54) METHOD FOR INCREASING THE SULFURIC ACID CONCENTRATION OF A SULFURIC ACID SOLUTION

(75) Inventors: Hendrikus Johannes Koehorst, Gytsjerk (NL); Teunis Leendert Boer, Emmen (NL)

(73) Assignee: Teijin Aramid B.V., Arnhem (NL)

( * ) Notice: Subject to any disclaimer, the term of this patent is extended or adjusted under 35 U.S.C. 154(b) by 0 days.

(21) Appl. No.: 13/884,887

(22) PCT Filed: Oct. 26, 2011

(86) PCT No.: PCT/EP2011/068707
§ 371 (c)(1),
(2), (4) Date: May 10, 2013

(87) PCT Pub. No.: WO2012/069270
PCT Pub. Date: May 31, 2012

(65) Prior Publication Data
US 2013/0236389 A1    Sep. 12, 2013

(30) Foreign Application Priority Data
Nov. 22, 2010 (EP) .................................. 10192021

(51) Int. Cl.
*C01B 17/88* (2006.01)
(52) U.S. Cl.
USPC .......................................... 423/522; 423/529
(58) Field of Classification Search
USPC ................................................. 423/522, 529
See application file for complete search history.

(56) References Cited

U.S. PATENT DOCUMENTS

| 2,172,617 A | * | 9/1939 | Koolman et al. | ............. 423/529 |
| 3,475,119 A | * | 10/1969 | Hummel | ....................... 423/529 |
| 4,274,910 A | | 6/1981 | Forter et al. | |

FOREIGN PATENT DOCUMENTS

WO    WO 2009/053254 A2    4/2009

OTHER PUBLICATIONS

International Search Report dated Feb. 3, 2012 from International Application No. PCT/EP2011/068707.
Written Opinion of the International Searching Authority dated Feb. 3, 2012 from International Application No. PCT/EP2011/068707.

* cited by examiner

*Primary Examiner* — Timothy Vanoy
(74) *Attorney, Agent, or Firm* — Oliff & Berridge, PLC

(57) ABSTRACT

Described is a method of increasing the sulfuric acid concentration of a first aqueous sulfuric acid solution with a sulfuric acid concentration of 82-89% to a concentrated sulfuric acid solution with a sulfuric acid concentration of at least 90%, including evaporating water from the first aqueous sulfuric acid solution in an evaporator vessel to the concentrated sulfuric acid solution, pumping around a mixture of the first aqueous sulfuric acid solution, part of the concentrated sulfuric acid solution, a second aqueous sulfuric acid solution, and hydrogen peroxide through an enameled piping system comprising the evaporator vessel and one or more heaters and pumps, wherein the piping system is operating at a temperature of at least 180° C., and the sulfuric acid concentration of the second aqueous sulfuric acid solution is at least 90%.

8 Claims, 4 Drawing Sheets

US 8,580,224 B2

METHOD FOR INCREASING THE SULFURIC ACID CONCENTRATION OF A SULFURIC ACID SOLUTION

BACKGROUND

The invention pertains to a method of increasing the sulfuric acid concentration of a sulfuric acid solution.

Sulfuric acid solutions are used in various chemical processes. One of these processes is the manufacture of aramid polymer. As an example, the manufacture of aramid fiber is mentioned.

Aramid fiber is normally produced by dissolving PPTA (para-phenylene terephthalamide) or another aramid polymer in 100% sulfuric acid after which the resulting spin dope is expelled through a spinneret. Sulfuric acid is then removed from the fibers in a washing step using water, resulting in a diluted solution of approximately 10-15% sulfuric acid ($H_2SO_4$).

The diluted sulfuric acid solution can be neutralized and disregarded, resulting in a considerable emission of sulfates and the use of considerable amounts of sulfuric acid and water from an external source. Therefore, it is more convenient to recycle it. For instance, it can be concentrated to 96% sulfuric acid in a series of different distillation processes. Such process is described in WO 2009/053254.

According to the method of WO 2009/053254 a sulfuric acid recovery unit has been used wherein the sulfuric acid concentration of diluted sulfuric acid is stepwise increased to obtain 96% sulfuric acid.

In a step of this process 78% sulfuric acid is first concentrated to 85% sulfuric acid, and then in a next step further concentrated to 96% sulfuric acid. This further concentration step is performed in an apparatus with inlet and outlet comprising an evaporator vessel, pump, and heaters. These elements are connected to each other by an enameled piping system. It was now experienced that after longer periods of operating serious problems occur in the piping system. The piping is enameled at its inner surface. This is necessary because sulfuric acid/water and sulfuric acid/hydrogen peroxide mixtures are extremely corrosive at elevated temperatures. The only system that can be used for industrial application are pipes, usually steel pipes, with a few millimeters thick enamel coating at their inner surfaces. It now appears that within a period of a few months the shiny enamel becomes dull. As such this is not a serious problem, but after a much longer period, which can be as long as about 3 years of operating, it appears that the enamel is seriously damaged, and even more seriously can completely be disappeared. The positions where the enamel has disappeared are called cracks. The sulfuric acid will then directly contact the steel at those cracks and will corrode the steel piping. Although this piping system has been made of 8 mm thick steel, sulfuric acid completely dissolves the steel within 4 hours. If this happens a hot stream (about 240° C.) of sulfuric acid will be sprayed over the site, which obviously can lead to life threatening situations.

Up to now the only remedy and prevention of this hazardous situation is the regular inspection of the piping and the timely replacement of the enamel layer. This is however and extremely expensive operation, which costs in the order of about 500 thousand euro. It is therefore of great importance to find a solution to prevent completely the impairment of the enamel layer.

In U.S. Pat. No. 4,274,910 (Forter) a method has been disclosed for preventing enamel cracks in the enamel of the heat exchanger. However, these cracks do not occur as the consequence of using concentrated sulfuric acid/hydrogen peroxide mixtures, but these cracks are the result of decreased "compressive stress" between the steel piping and the enamel coating by temperature differences during the heat exchange process. Compressive stress is required to prevent crack forming. As described by Forter, column 1, lines 17-49, this problem typically occurs in heat exchangers when uneven cooling and heating takes place. Forter has solved this problem by providing the heat exchanger with a jacket for circulating a heating medium thereby diminishing the temperature fluctuations in the heat exchanger. The Forter apparatus is suitable for making concentrated sulfuric acid from diluted sulfuric acid, such as explained in the examples where 75% sulfuric acid is obtained from 41.5% sulfuric acid, and thereafter the 75% sulfuric acid is further concentrated to 98% sulfuric acid. The present invention does not relate to preventing cracks in the heat exchanger but to solve the problem of occurring cracks in the evaporator vessel and pipelines, which problem does not occur when using the sulfuric acid concentrations of Forter. Thus in Forter's apparatus it is not required to provide the evaporator vessel with an enamel layer (column 4, lines 3-6). When making highly concentrated sulfuric acid/hydrogen peroxide mixtures, which mixture is much more corrosive than sulfuric acid alone, the use of an enameled evaporator vessel and enameled piping is necessary and without the application of this invention cracks will be formed when using the aggressive sulfuric acid/hydrogen peroxide mixture.

SUMMARY

It has now been found that a novel method can be used that renders operating conditions which do not lead to impairment of enamel.

To this end the invention pertains to a method of increasing the sulfuric acid concentration of a first aqueous sulfuric acid solution with a sulfuric acid concentration of 82-89% to a concentrated sulfuric acid solution with a sulfuric acid concentration of at least 90%, comprising the steps of evaporating water from the first aqueous sulfuric acid solution in an evaporator vessel to the concentrated sulfuric acid solution, pumping around a mixture of the first aqueous sulfuric acid solution, part of the concentrated sulfuric acid solution, a second aqueous sulfuric acid solution, and hydrogen peroxide through an enameled piping system comprising the evaporator vessel and one or more heaters and pumps, which piping system is operating at a temperature of at least 180° C., characterized in that the sulfuric acid concentration of the second aqueous sulfuric acid solution is at least 90%.

DETAILED DESCRIPTION

Figure 1:
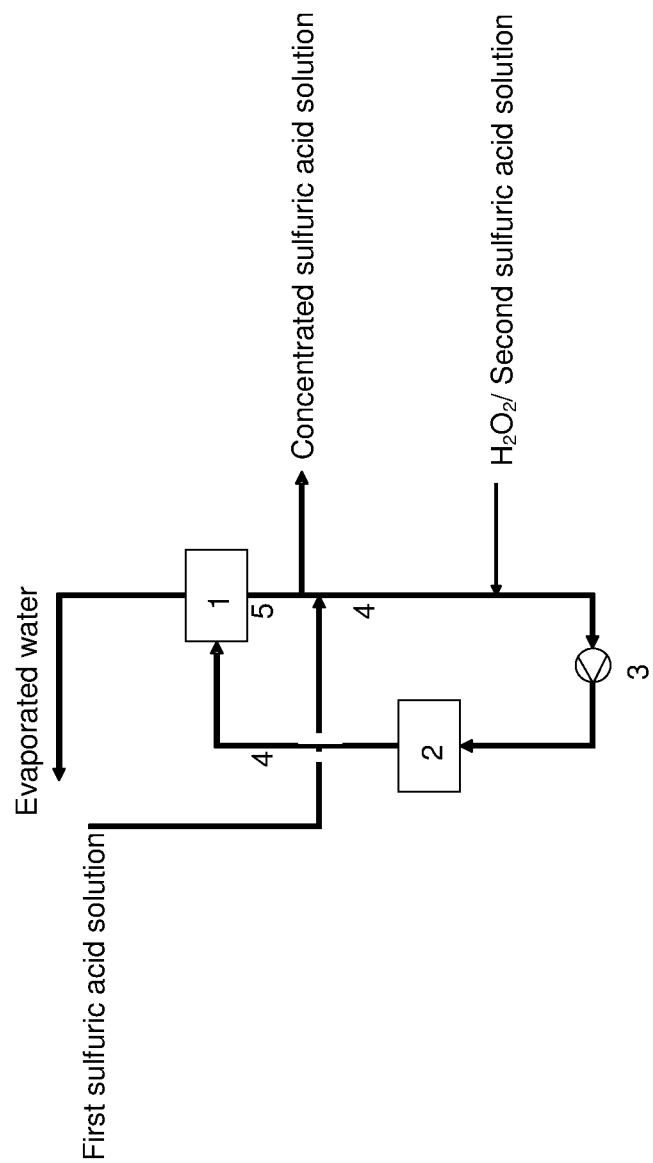
FIG. 1 is a block diagram of an evaporator process.

The above method by recycling a mixture of >90% sulfuric acid and hydrogen peroxide allows obtaining high sulfuric acid concentrations and the use of mixtures of sulfuric acid and hydrogen peroxide, which recycling step is not disclosed or suggested in Forter.

This method allows the concentration of the sulfuric acid solution up to 98% concentrated sulfuric acid. Higher concentrations of sulfuric acid up to 130% can be obtained by adding oleum or sulfur trioxide from an external source. The concentrated sulfuric acid of for instance 96% as directly obtained in the process can so be further concentrated up to 130% sulfuric acid. It is common to increase the concentrated sulfuric acid in this manner to 100% or 105% sulfuric acid, for instance from 96% sulfuric acid to 100% sulfuric acid. In general 90 to 105%, more preferably 98 to 105% sulfuric acid solution is considered a suitable concentration for use in aramid fiber manufacture.

To this system hydrogen peroxide or a mixture of hydrogen peroxide and a first sulfuric acid solution, or a mixture of hydrogen peroxide and a second sulfuric acid solution, or a combination of mixtures of hydrogen peroxide and a first sulfuric acid solution and hydrogen peroxide and a second sulfuric acid solution, is added in order to oxidize organic contaminants and optionally sulfur dioxide if formed during the concentration process. The mixtures of hydrogen peroxide and the first and/or the second sulfuric acid solution can be made as a premix. Preferably, a premix of hydrogen peroxide and the second sulfuric acid solution is used. During the concentration process, for instance to about 96%, organic components in the acid are decomposed by oxidation with hydrogen peroxide. According to WO 2009/053254 the hydrogen peroxide is mixed with part of the 78% sulfuric acid to allow for a larger amount of hydrogen peroxide to be added, thereby increasing the conversion of organic components.

According to this invention the second sulfuric acid solution that is used has no longer the same relatively low concentration as that of the sulfuric acid solution that is used to make the first sulfuric acid solution, but has a concentration that is at least 90%, thus higher than the concentration of the first sulfuric acid solution. Preferably the second sulfuric acid solution has the same concentration as the concentrated sulfuric acid solution, so that a fraction of the concentrated sulfuric acid solution as obtained after evaporation in the evaporator vessel, optionally after addition of oleum and/or sulfur trioxide to further increase the sulfuric acid concentration, can be used for mixing with the hydrogen peroxide.

As hydrogen peroxide usually a 30-70% aqueous hydrogen peroxide is used, preferably aqueous 50% hydrogen peroxide solution. This enables a method wherein some of the concentrated sulfuric acid solution is tapped off and mixed with the hydrogen peroxide solution. Thus if 78% feed acid (the sulfuric acid solution which is used to make the first sulfuric acid solution) is concentrated to 96% sulfuric acid (the concentrated sulfuric acid solution) the hydrogen peroxide solution is preferably mixed with 96% sulfuric acid. If the concentrated sulfuric acid solution is further concentrated by adding oleum and/or sulfur trioxide, also fraction of this further concentrated sulfuric acid solution can be used as the second sulfuric acid solution.

Although the difference between adding a 78% sulfuric acid solution and adding a 96% sulfuric acid solution as the second aqueous sulfuric acid solution seems negligible, the effects thereof are unexpectedly major. Thus where the addition of 78% sulfuric acid as the second sulfuric acid solution (according to WO 2009/053254) leads to complete ablation of the enamel coating within a period of about 3 years, the 96% sulfuric acid solution does not or almost not lead to dullness of the enamel layer during such period in time. This finding is the more remarkable because it is known that enamel is fully resistant to water, hydrogen peroxide and sulfuric acid up to 350° F. (180° C.) and it is unknown that this resistance is different at higher temperatures.

In a preferred embodiment the sulfuric acid concentration of the first aqueous sulfuric acid solution is about 85%, the sulfuric acid concentration of the concentrated sulfuric acid solution is 94 to 98%, and the second aqueous sulfuric acid solution is a fraction of the concentrated sulfuric acid.

The first sulfuric acid solution is pumped into the enameled piping system, the water is evaporated in the evaporator vessel, the water vapor is removed and the concentrated sulfuric acid is partly pumped around and mixed with fresh first sulfuric acid solution, hydrogen peroxide and the second sulfuric acid solution, and for another part removed from the system to be further used. The piping system is preferably kept at a temperature between 220 and 250° C., but the temperature may also be higher. Temperatures between 230 and 240° C. are preferred.

The installation for performing this method is described in FIGS. 1 to 4.

FIGS. 1-4 show block diagrams of an evaporator process according to the invention.

The block diagrams show the following elements:
1=evaporator vessel
2=heaters
3=circulation pump
4=enameled piping system
5=outlet evaporator vessel In FIG. 1 the sulfuric acid is concentrated, for instance, to 96% $H_2SO_4$ using an evaporator vessel.

The first sulfuric acid solution, which for instance may be about 85% sulfuric acid as obtained by a previous concentration step, for instance from about 78% sulfuric acid to about 85% sulfuric acid, is introduced into the system after the outlet 5 of the evaporator vessel 1 and mixed with part of the concentrated sulfuric acid. Another part of the concentrated sulfuric acid is withdrawn from the system to be used, for instance, in aramid polymerization reactions and which for another part can be used to make the hydrogen peroxide/second sulfuric acid mixture. The mixture of concentrated sulfuric acid solution and first sulfuric acid solution is pumped by circulation pump 3 through the piping system 4 to heaters 2. Prior to entering the heaters 2 a pre-mix of hydrogen peroxide and second sulfuric acid solution is also entered into the system. The hydrogen peroxide/second sulfuric acid mixture is preferably made as a premix of hydrogen peroxide and concentrated sulfuric acid as has been obtained from the evaporator vessel and optionally as being enriched by oleum and/or sulfur trioxide. The complete mixture of concentrated, first and second sulfuric acid solution and hydrogen peroxide is concentrated in the evaporator vessel 1 by evaporation to obtain the concentrated sulfuric acid solution and the evaporated water (steam) is removed from the evaporator vessel 2 and the piping system 4, cooled down to liquid water and reused.

Figure 2:
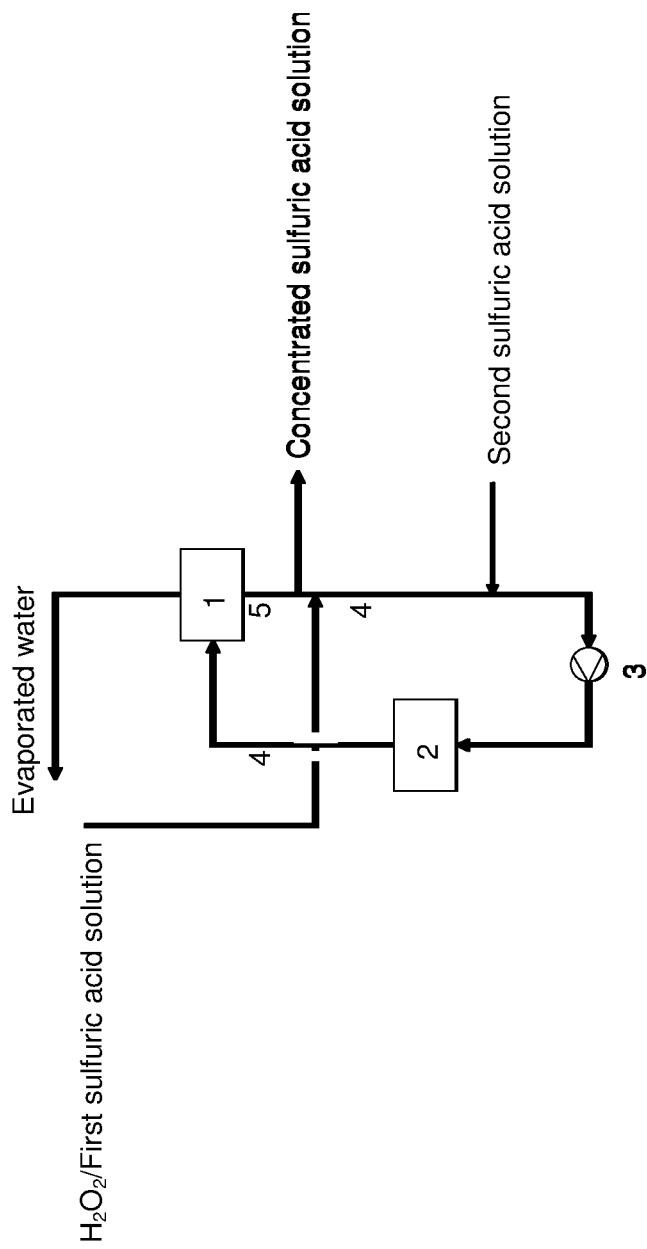
FIG. 2 is a block diagram of an evaporator process.
Figure 3:
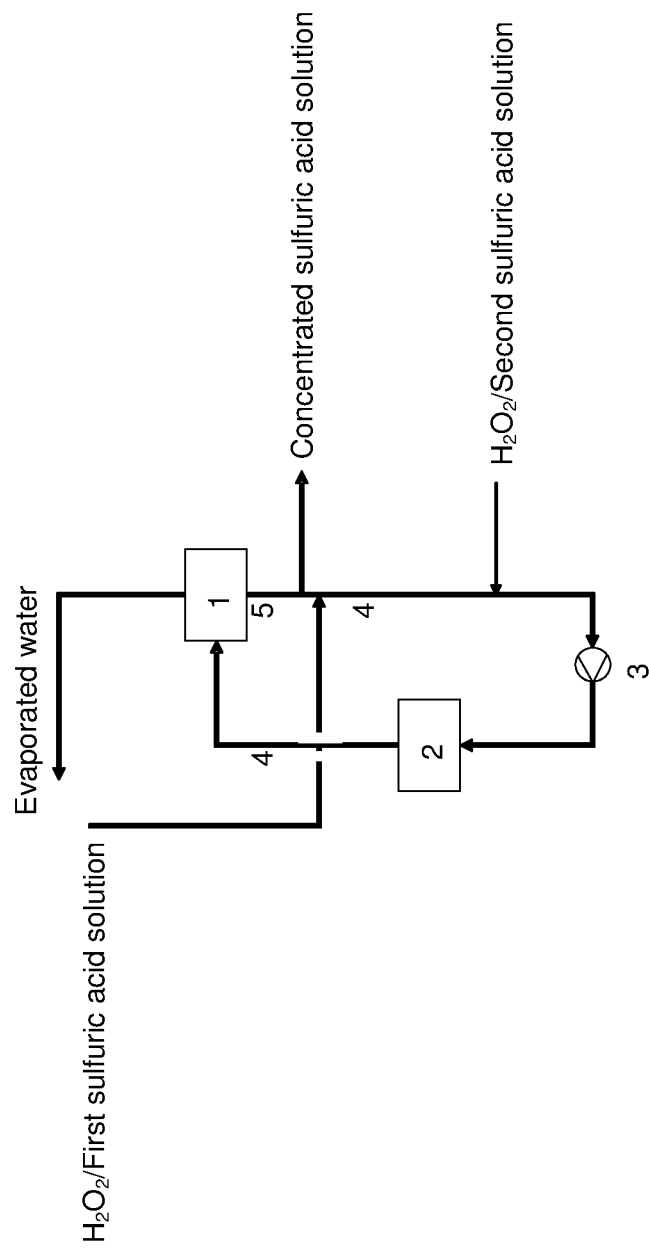
FIG. 3 is a block diagram of an evaporator process.
Figure 4:
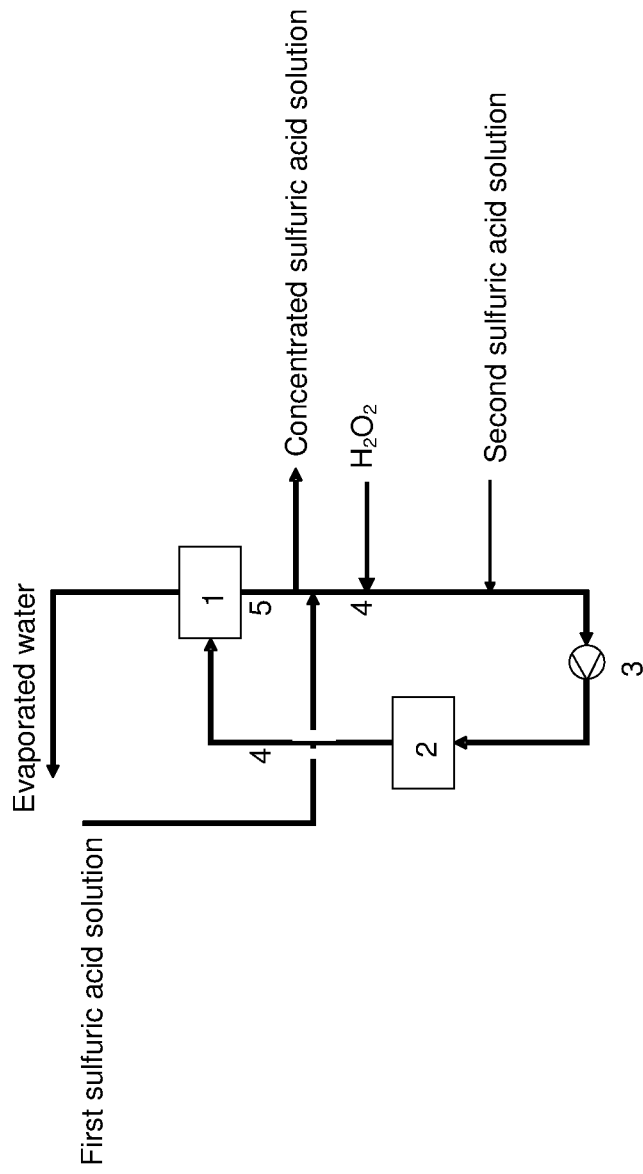
FIG. 4 is a block diagram of an evaporator process.

Alternative embodiments are depicted in FIGS. 2 to 4. In FIGS. 2 to 4 the process is similar to the process of FIG. 1, but hydrogen peroxide is added as a premix with the first sulfuric acid solution (FIG. 2), as premixes of both the first and the second sulfuric acid solution (FIG. 3), and directly as aqueous hydrogen peroxide solution (FIG. 4).

The following example illustrates the invention

In the installation according to FIG. 1 85% sulfuric acid was concentrated to 96% sulfuric acid. A premix of hydrogen peroxide and sulfuric acid was prepared as follows.

101.15 Kg/h of 50% $H_2O_2$ were premixed with 548.88 Kg/h of 96% $H_2SO_4$ and injected into the system at 230° C. No ablation or dullness of the enamel was observed.

In a comparison experiment the premix according to WO 2009/053254 was used. Thus 101.15 Kg/h of 50% $H_2O_2$ were premixed with 509.7 Kg/h of 78% $H_2SO_4$ and injected into the system at 230° C. After 2 months the enamel layer had lost its shiny look and had obtained a dull surface. After about 3 years cracks were observed at sites were the enamel layer was completely ablated.

The invention claimed is:

1. A method of increasing the sulfuric acid concentration of a first aqueous sulfuric acid solution with a sulfuric acid concentration of 82-89% to a concentrated sulfuric acid solution with a sulfuric acid concentration of at least 90%, the method comprising:
   evaporating water from the first aqueous sulfuric acid solution in an evaporator vessel to the concentrated sulfuric acid solution; and
   pumping around a mixture of the first aqueous sulfuric acid solution, part of the concentrated sulfuric acid solution, a second aqueous sulfuric acid solution, and hydrogen peroxide through an enameled piping system comprising the evaporator vessel and one or more heaters and pumps, wherein
      the piping system is operating at a temperature of at least 180° C., and
      the sulfuric acid concentration of the second aqueous sulfuric acid solution is at least 90%.

2. The method according to claim 1, wherein the concentrated sulfuric acid solution has a sulfuric acid concentration of 90 to 105%.

3. The method according to claim 1, wherein the second sulfuric acid solution is a fraction of the concentrated sulfuric acid solution.

4. The method according to claim 1, wherein the sulfuric acid concentration of the first aqueous sulfuric acid solution is about 85%, the sulfuric acid concentration of the concentrated sulfuric acid solution is 94 to 98%, and the second aqueous sulfuric acid solution is a fraction of the concentrated sulfuric acid solution.

5. The method according to claim 1, wherein the part of the concentrated sulfuric acid solution that is pumped through the enameled piping system is mixed with oleum and/or sulfur trioxide to obtain a concentrated sulfuric acid solution with 98-130% sulfuric acid.

6. The method according to claim 1, wherein the enameled piping system is operating at a temperature between 220 and 250° C.

7. The method according to claim 1, wherein the hydrogen peroxide is premixed with the first and/or the second aqueous sulfuric acid solution.

8. The method according to claim 1, wherein the part of the concentrated sulfuric acid solution that is pumped through the enameled piping system is mixed with oleum and/or sulfur trioxide to obtain a concentrated sulfuric acid solution with 98-105% sulfuric acid.

* * * * *